United States Patent [19]
Elliott

[11] 3,752,585
[45] Aug. 14, 1973

[54] SPECTROMETER SYSTEM CONTAINING AN INTERCHANGEABLE ENCODING CASSETTE

[75] Inventor: William G. Elliott, Lincoln, Mass.

[73] Assignee: SpectraMetrics, Incorporated, Burlington, Mass.

[22] Filed: Apr. 17, 1972

[21] Appl. No.: 244,665

Related U.S. Application Data

[63] Continuation-in-part of Ser. Nos. 106,500, Jan. 14, 1971, Pat. No. 3,658,424, and Ser. No. 106,561, Jan. 14, 1971, Pat. No. 3,658,423, each is a continuation of Ser. No. 710,881, March 6, 1968, abandoned.

[52] U.S. Cl................ 356/98, 250/233, 250/237 R
[51] Int. Cl............................................. G01j 3/02
[58] Field of Search.................... 356/51, 74–101; 250/233, 237

[56] References Cited
UNITED STATES PATENTS

| | | | |
|---|---|---|---|
| 3,578,980 | 5/1971 | Decker et al. | 250/237 |
| 3,640,625 | 2/1972 | Ibbett et al. | 356/98 X |
| 3,700,332 | 10/1972 | Decker | 356/97 |

Primary Examiner—Ronald L. Wibert
Assistant Examiner—F. L. Evans
Attorney—Richard P. Crowley

[57] ABSTRACT

An interchangeable encoding cassette and a spectrometer system employing such cassette, which cassette device encodes the spectral energy of radiation at the exit focal plane of a spectrometer, the spectral energy represented by horizontal and vertical components. The cassette device comprises a rotating encoding disc, a stationary aperture plate, a frame element, and a shaft secured to the encoding disc for rotation therewith. The frame includes bearings on which the shaft is mounted and includes a reference pin. The spectrometer includes a pair of locater mounts, each of which has a precision V groove adapted to receive the shoulders of the bearing element of the cassette, one of such locators having an adjustable track adapted to receive the pin element, whereby the shaft serves as a primary reference and the cassette device is adjusted into the desired precision position by the position of the reference pin in the restraining track.

13 Claims, 5 Drawing Figures

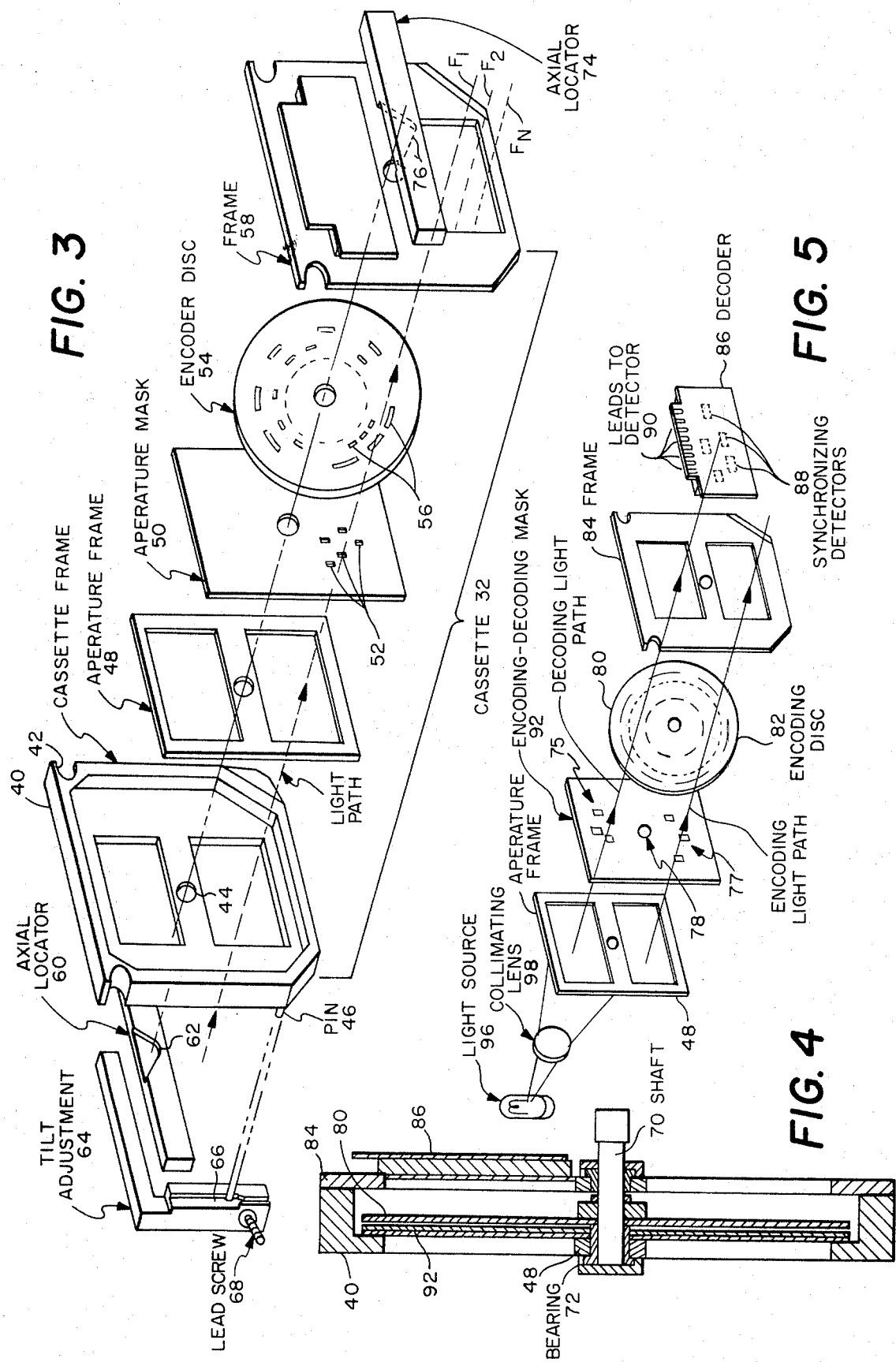

SPECTROMETER SYSTEM CONTAINING AN INTERCHANGEABLE ENCODING CASSETTE

REFERENCE TO PRIOR APPLICATIONS

This application is a continuation-in-part of U.S. Ser. Nos. 106,500 and 106,561, filed Jan. 14, 1971, now U.S. Pat. Nos. 3,658,424 and 3,658,423, respectively, which applications are continuations of U.S. Ser. No. 710,881, filed Mar. 6, 1968 (now abandoned).

BACKGROUND OF THE INVENTION

Spectrometers are devices employed for sensing or measuring the radiant spectral energy distribution emitted from a radiant energy source and impinging on the entrance aperture of the device. The analysis of the spectral energy distribution; for example, a quantitative spectral analysis, requires some technique for selecting wave lengths or groups of wave lengths of the spectral energy distribution in the exit focal plane of the spectrometer. Typically, conventional optical emission spectrometers utilize a multiplicity of exit slits and photo multipliers, one slit and one multiplier being employed per selected spectral energy line in the focal plane, and the signal processed from the various photo multipliers and analyzed to obtain the desired information. Various alternate techniques have been described (see M.J.E. Golay, J. Opt. Soc. Amer. 39, 437 (1949), and P. Fellgett, J. Phys. Radium 19, 187 (1958)). For example, in an emission spectrometer, spectral energy emitted by an excited atomic sample may be optically chopped and then focused at the exit focal plane of the spectrometer, and a wave length corresponding to the atomic constituent desired selected. A photo multiplier will quantitatively sense the energy flux and provide an electrical signal, which is then amplified and synchronized to the optical-chopping element. The amplifier may provide selected time constants or a linear integration mode that integrates the signal upon command. Also, this mode may be actuated by a time sequence to integrate for a given period of time.

In other techniques, for example, where energy to be measured eminates from a source which is of low concentration or which has a background radiation which might interfere with the information to be analyzed, wherein the background radiation or low concentration might mask the desired information or provide erroneous or inaccurate results, mechanical choppers or encoding discs are employed. In such previous devices, spectral energy is presented at the exit focal plane, and the intensity of the displayed spectral components is then modulated at different frequencies so that each frequency so modulated is representative of a group of wave lengths of the spectral energy at the exit focal plane. The modulated signals are then collected and focused on a single detector to produce an electrical signal, which signal is then separated into component electrical signals corresponding to at least one of the modulated frequencies, which provides an indication signal as a function of the intensity of the spectral component selected. Modulation of the frequency may be carried out by a rotating encoding disc typically having a series of apertures for chopping the dispersed spectral band of radiation. The spectral energy distribution so chopped has, in the past, comprised a one-dimensional line display. Apparatuses and techniques for measuring the energy levels of different wave lengths employing mechanical choppers are well known (see U.S. Pat. Nos. 2,721,259, 3,143,654 and 3,151,247).

All of the prior art techniques, methods and apparatuses present difficulties wherein it is required to obtain high resolution spectra over a wide wave length range, because the spectral energy is spatially extended over an appreciable horizontal or single-dimensional distance along the exit focal plane. Further, prior art techniques for interchangeably selecting groups of spectral energy lines for measurement have in the past entailed bulky mechanical structures containing various arrays of exit slits and photo multipliers with the result that rapid interchange of such structures has proven quite difficult. Such interchange is time-consuming and requires highly trained personnel. The difficulties associated with encoding; that is, modulating, with a desired spatial temporal encoder and collecting, analyzing and decoding the information are greatly enhanced, particularly where interchange-ability is desired where a two-dimensional (horizontal-vertical) spectral energy distribution is provided, such as where a multiple-line two-dimensional essentially rectangular or square focal plane spectral energy distribution is provided. Accordingly, there exists a requirement for apparatus and technique for the improved encoding of spectral energy distribution, particularly as to spectral energy distribution in an essentially two-dimensional compact focal exit plane.

SUMMARY OF THE INVENTION

My invention concerns an encoding device for modulating selected radial energy levels, a spectrometer device containing and using such encoding device, and a method of employing such encoding device. In particular, my invention relates to an interchangeable encoding device in cassette form, which cassette device when employed in a spectrometer providing a two-dimensional spectral energy distribution provides a means for rapid quantitative spectral measurements with selected groups of spectral energy lines. My invention also is directed to a unique method of employing the encoding device, whereby such device is employed in cassette form, which cassette is rapidly interchangeable, particularly in a two-dimensional spectrometer system, wherein precision and repeatability of the position of the cassette is required.

My encoding device comprises a compact cassette-type device containing unique and precise locating-reference means so that the cassette may be removed or replaced in use with a spectrometer and the device. In particular, my encoding device comprises a mechanically interchangeable cassette particularly useful with an echelle spectrometer when in the exit focal plane of the echelle spectrometer wherein two-dimensional spectral energy distribution pattern is located. The encoding cassette device contains a precision locating-reference means, whereby mechanical interchangeability within a tolerance of a few wave lengths of light may be achieved. In order to provide an interchangeable encoding device, precision location of the device and interchangeability is required, while the device should be easily employed and compact in nature. My device may be employed in encoding one-dimensional; that is, horizontal or line spectral energy distribution, but it is particularly useful for two-dimensional vertical-horizontal spectral energies that are produced by the echelle grating spectrometer and the technique as described in my parent application. The spectrometer therein described by reason of the arrangement of the prism and grating in respect of each other provides an essentially square focal plane for at least one spectral octave. This device yields simultaneously high resolution and broad spectral range with desirable properties in that only a small range of angles with respect to the central wave focal point is produced.

As described, one embodiment of my spectrometer comprises introducing into the first spectral focal plane a spatial-temporal encoder and then collecting the transmitted energy on a single detector. This technique provides a unique time-sequence code corresponding to each resolution element in the spectral focal plane. The corresponding intensity may be decoded from the output of the single detector by utilizing temporal correlation. In the event that only a small portion of the spectral data is desired, multiple reimaging can be utilized with a stationary transmission mask in the first spectral focal plane followed by reimaging into a second spectral focal plane where the spatial-temporal encoder is located. Optionally, a spatial encoding disc or other type of encoder or an image tube may be employed at the spectral focal plane, or at a subsequent image of the spectral focal plane where the mutltiple line essentially square focal plane resides.

My encoding device employs polar coordinates rather than an x or x-y mechanical system to locate with precision the device when placed in the focal plane of the spectrometer. The employment of the polar coordinate technique permits the use of a central shaft as a primary reference, rather than relying upon the mechanical stability of one or two perpendicular axis components; for example, as employed in prior art encoding techniques. The employment of polar coordinates as in my encoding device provides precision in repeatability where the device is employed in an interchangeable cassette-type manner, particularly in a two-dimensional horizontal-vertical square spectral energy distribution. Where a two-dimensional spectra must be encoded, the device must be positioned relative to several different lines in both dimensions.

My encoding device comprises a frame, an aperture plate to pass the selected spectral lines or energy groups, a rotating or translating encoding plate or disc, the encoding disc secured to a central shaft for rotation therewith, the shaft serving as a primary reference axis in the polar coordinate system. A precision-bearing shoulder provides a primary mechanical reference for the shaft axis, while a fine tuning reference means, such as a pin on the cassette frame, fits into a track in the spectrometer so that the desired fine adjustment in the angular direction may be made. Thus, the cassette-type device may be interchangeable by employing a central shaft as the primary reference axis and a reference pin in a track for angular adjustments, thereby providing for a device which may be removed or replaced within a mechanical tolerance of approximately 0.0002 inches or less. The mechanical structure in the device contains only the minimum kinematic restraints, and no deformation is introduced by the supported structure and frame of the device.

Mechanical rotary motion for the movement of the encoding plate is provided and transmitted to the chopper disc via a shaft, which shaft is automatically disengaged from a motor drive when the cassette is removed from the spectrometer. A variety of cassettes may be provided containing different groups of apertures in the aperture plate and different encoding apertures in the disc corresponding to the different spectral lines and positions of the various elements in the one or two-dimensional spectral energy distribution. The apertures of the encoding disc in each particular cassette correspond and are optically aligned with the apertures of the spectral aperture plate. The compact two-dimensional nature of the echelle spectrum in particular permits cassette encoding device sizes only slightly larger than the two-dimensional spectral focal plane; for example, in the case of a three-quarter meter echelle spectrometer having a resolving power of approximately 500,000, actual coverage from 2,500 Angstroms to 7,000 Angstroms can be obtained by a cassette encoding device having dimensions of approximately 6 inches square and 1 inch thick.

DESCRIPTION OF THE DRAWINGS

FIG. 3 is a diagramatic exploded view of my encoding cassette.

FIG. 4 is a representative sectional view of my encoding cassette device of FIG. 3.

FIG. 5 is a diagramatic exploded view of an encoding and decoding cassette device.

DESCRIPTION OF THE PREFERRED EMBODIMENTS

Figure 1:
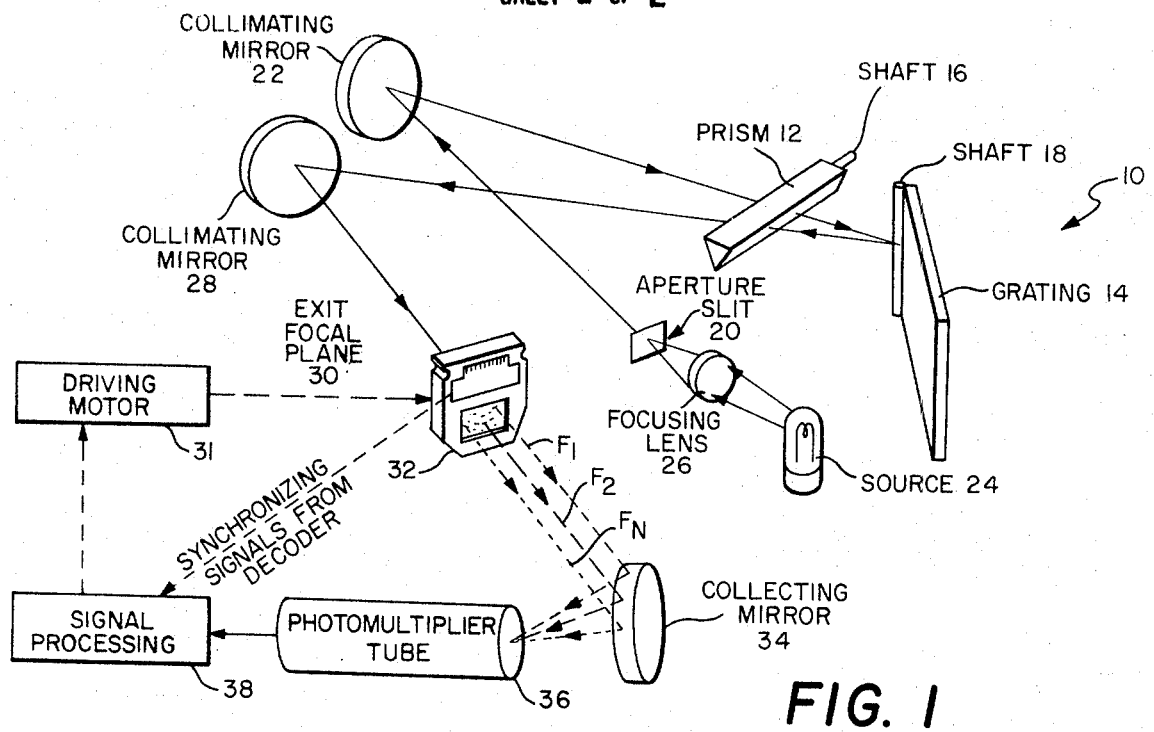
FIG. 1 is a diagramatical illustration of an echelle spectrometer showing my encoding device in the spectrometer system.

FIG. 1 shows a spectrometer system employing the encoding device of my invention in an echelle spectrometer of the type described in my parent application, and also illustrates in particular the relationship of the prism, the echelle grating and the mounting and relative axis of rotation of said prism and grating elements. In the system illustrated, radiant energy from a source 24, such as plasma-enhanced atomic emission as an excitation source (see U.S. Pat. No. 3,596,128), is focused by focusing lens 26 on aperture slit 20. Energy passing through aperture slit 20 is incident on a collimating mirror 22 which directs such energy into prism 12 where it is dispersed along a first coordinate extending in the directional length of the slit. The prism is adapted to be rotated by shaft 16. The dispersed incident energy from prism 12 is incident on an echelle grating 14 adapted for movement on grating mounting shaft 18 generally parallel to the rulings in the grating. Prism 12 rotates about shaft 16, while grating 14 rotates about shaft 18. The reflective energy from the echelle grating 14 in this embodiment passes again through prism 12 where it is further dispersed and directed toward collimating mirror 28 from whence it is focused at an exit focal plane 30. The spectrometer system illustrated passes the energy through the prism for a second time; however, this is an optional feature and the energy may be reflected from the grating directly to the collimating mirror.

The spectral data presented at the exit focal plane 30 contains a two-dimensional pattern consisting of a series of energy line segments arranged vertically, one above the other. Each energy line segment contains high resolution spectral information dispersed horizontally. Each successive line segment contains information for successive orders of the echelle grating 14. The unique property of the spectrometer system shown and disclosed is that the spectrally dispersed energy focused at the exit plane 30 may be collected by appropriate optics following the exit focal plane, and an essentially white light image formed of the echelle grating prism dispersing system. The two-dimensional pattern presented at the exit focal plane is essentially square.

A cassette-type interchangeable encoding device 32 is shown in position at the exit focal plane, the device containing a stationary aperture plate mask 50 which selects the desired plurality of spectral lines, the plate being in position in the exit focal plane 30. A unique time sequence code is imposed on each of the selected spectral lines emerging from the aperture plate 50 by the employment of a rotating encoding disc 54, the light eminating from the encoding device 32 shown in illustrative form as $F_1$, $F_2$ and $F_n$ presenting the selected spectral line frequency on which the unique time sequence code has been imposed by the rotating encoding disc 54. The spectral energy $F_1$, $F_2$ and $F_n$ is directed to a collecting mirror 34, and hence to a single photo multiplier tube 36. The output of the photo multiplier tube is directed through a signal-processing system 38. The rotating encoding disc 54 is rotated by a driving motor 31 which may be controlled or fed back into the signal-processing system. The output of the photo multiplier 36 is decoded by the signal-processing system to obtain a quantitative measure of the energy corresponding to each selected spectral line. The compact nature of the echelle spectrometer exit focal plane 30; that is, the two-dimensional form, makes it possible to mount mechanically the spectral aperture plate and the encoding disc 50 in an interchangeable structure which can be removed and/or replaced with mechanical precision to provide repeatability of the spectral line selection by the insertion of different cassettes containing aperture plates with varying spectral line selections.

Figure 2:
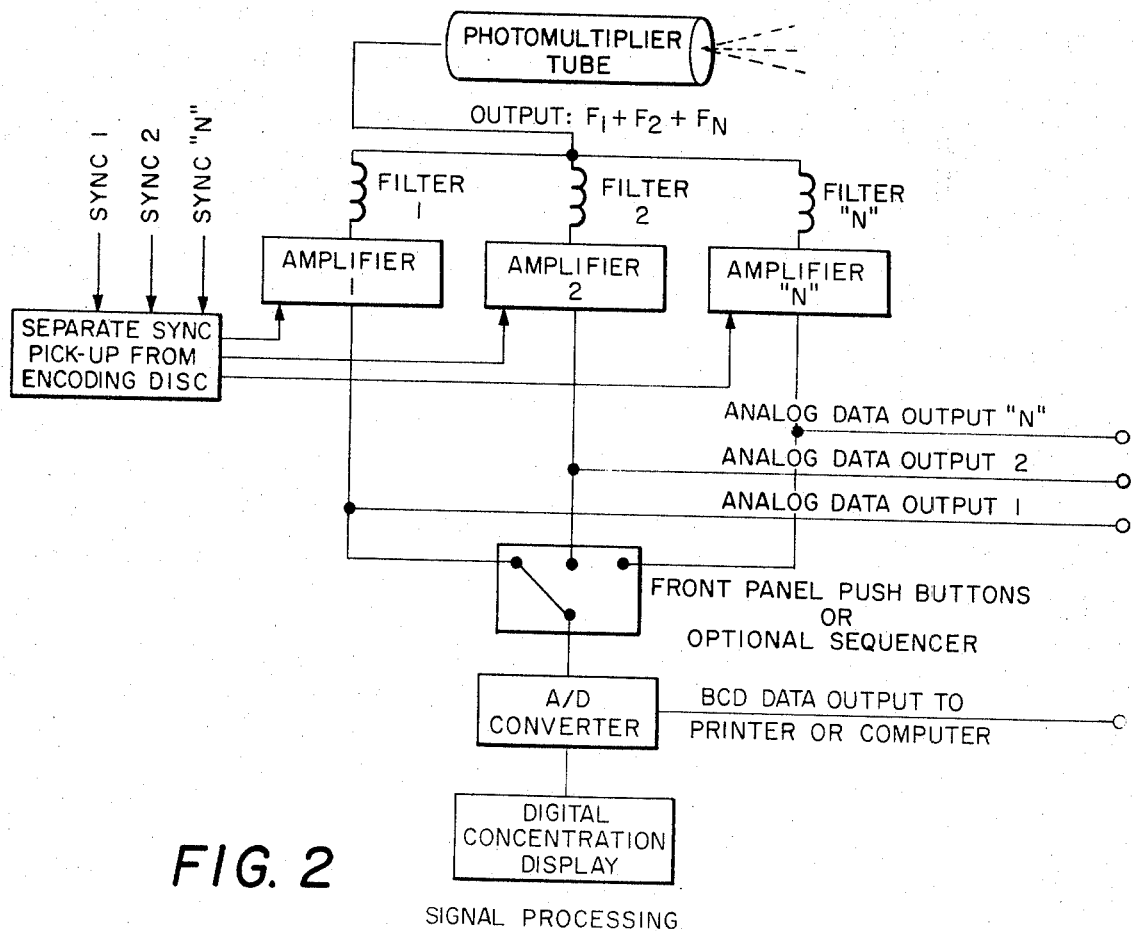
FIG. 2 is a schematic block diagram illustration of the signal processing of my spectrometer system.

FIG. 2 illustrates one system of signal processing of the output from the photo multiplier 36 shown in the spectrometer of FIG. 1 wherein the spectral energy is encoded. For the purposes of illustration only, $F_1$, $F_2$ and $F_n$ represents the modulated energy fed to the signal-processing system.

FIG. 3 is an illustration in exploded form of my cassette encoding device which includes a cassette frame 40 containing a central aperture 44 adapted to accept a shaft element 70 in a bearing assembly 72, the cassette frame having indentations 42 to serve as a finger-holding or grasping device for the operator. An aperture mask 50 contains a plurality of apertures 52 therein, the apertures 52 positioned to select the desired spectral integral which is to be analyzed. An encoding disc 42 contains a series of apertures 56 aligned with the apertures 52, the encoding apertures so selected to impose a particular time sequence code so as to modulate the energy from the spectral apertures 52. The apertures may be evenly spaced slots for an encoding function where the encoder is essentially in a simple harmonic-temporal modulation mode; or if desired to utilize a complex time sequence mode, the apertures may vary in size, form and space, thereby permitting a larger number of spectral lines to be encoded simultaneously. Typical encoding methods employed to impart a time sequence code are set forth in J.A. Decker and M.O. Harwitt, Applied Optics 7, 2205 (1968).

Typically, the apertures 52 are selected from a number of elements, for example, one to ten elements, so that the cassette body may be interchanged in laboratories by the operator into the spectrometer in a short period of time. The spectral lines selected are typically for a variety of elements or for the same elements in different matrices, or to permit the measurement and summing up of more than one line of a given element where strong chemical interferences or very low concentration are present. The selection of the spectral line often depends upon the different fields of application in which the spectrometer system is employed, such as, for example, in biomedical, wear metals, petrochemical, water-air pollution, exhaust gas, industrial water, waste analysis and the like. In the embodiment shown, the apertures 52 and 56 are precision-etched on a thin metal plate, the position of the apertures depending on the energy distribution of the energy in the focal plane, and typically, rectangular in nature in the two-dimensional plane illustrated. The particular selection of the length and the space comprise the desired code and modulation for each element selected. The encoding device 32 has a central shaft 70 mounted in a bearing assembly 72, upon which shaft the encoding disc 54 is secured for rotation therewith. The aperture plate 50, the encoding disc and frame 54 and the aperture frame 48 are engaged in a close spatial relationship within the body frame 40.

My cassette-encoding devices are inserted into a spectrometer system so that the aperture plate 50 is located at the exit focal plane of the spectrometer. Secured to the spectrometer structure and aligned with the optical system are a pair of spaced-apart axial locaters 74 and 60, each having hardened V grooves 62 and 76. The pair of hardened V grooves provide a precision mechanical reference point attached to the spectrometer for the shaft 70 and bearing 72. The precision shaft-bearing assembly of the cassette device is employed as a primary point geometric reference for the precision locating of the encoding device. In use, the encoding device 32 is inserted between the pair of locaters so that the shoulders of the precision bearing 72 rest within the sides of the V grooves 76 and 62 as the cassette is placed in the proper position by the operator. Such a mechanical structure and arrangement insures that the location of the cassette device 32 is repeatable with respect to the axial center of rotation. Cassette frame 40 has an outwardly extending reference pin 46 located on the exterior side. Secured to the spectrometer mechanical structure is a tilt adjustment bar 64 having a track 66 and lead screw 68. The line angular position of the encoding device 32 is positioned with precision by the location of hardened reference pin 46 which on correctly positioned insertion of the cassette device 32 permits the pin to slide into a close fit in the track 66. Fine adjustment of the angle or tilt of the cassette device 32 can then be made if necessary by adjusting the position of the adjustment bar 66.

The compact, simple mechanical structure of the encoding cassette device 32 is sufficiently rigid mechanically to maintain appropriate dimensional stability between the aperture plate 50 and the encoding disc 54 so that no relative distortion between these elements occurs during cassette replacement, storage or use. The mechanical drive for the encoding disc 54 is provided in the spectrometer, such as, for example, by a friction idler similar to that utilized for photographic or tape recording precision speed drives. The idler is mounted to a spring-loaded arm which disengages when the cassette device is removed from the spectrometer. The encoding disc 54 may be driven or stepped at a variety of speeds, depending upon the modulation desired, with feedback control of the motion.

As illustrated in FIG. 5, my encoding cassette device may also contain a second aperture plate with a group of photo detectors so positioned to provide synchronization for decoding each spectral signal, so that the information necessary to provide quantitative measurement of each selected spectral line may also be provided by each cassette. In this manner, the cassette becomes both an encoding and decoding cassette. FIG. 5 shows an aperture plate 92 containing central shaft aperture 78, spectral encoding apertures 77 located in the lower portion of the plate 92, and decoding apertures 75 located in the upper portion of plate 92, a rotating encoding disc 80 containing encoding apertures 82, a frame 84 containing upper and lower areas and a decoding unit 86 containing a plurality of individual photo detectors 88 aligned with the apertures 75. The encoding-decoding cassette device as shown and described is similar to device 32, except that the decoding mask 86 is employed with individual photo detectors 88 and circuitry 90. In operation, the decoding areas have individual synchronizing detectors to pick up the light from each aperture of the decoding aperture plate. The encoding section of the device utilizes a single detector, such as a photo multiplier tube 36, to provide high resolution and a wide spectrum for all encoded elements, while the decoding section employs separate detectors for each coding element and coding aperture to decode the encoded elements. In operation, an independent light source 96, such as a bulb shown, a light-emitting dioxide, fiber optics, etc., provides illumination through collimating lens 98 for the decoding detectors 88 and the encoding-decoding cassette 32 of FIG. 5. Synchronizing signals from each detector are fed to individual lock-in signal-processing amplifiers in the signal-processing system (see FIG. 1 and FIG. 2), the detectors providing the signals to be correlated.

In operation, the two-dimensional spectrum is provided, segmented into sections stacked one above the other in order, with the longest wave length at the bottom and the shortest at the top. The spectral distribution would be, for example, a 4-by-5-inch focal plane. My encoding cassette device is then placed in position with the aperture plate in the exit focal plane of the echelle spectrometer, the encoding device having the exit apertues properly located for the spectral line desired in the two-dimensional spectrum for each of the selected elements. The spectral light passing through the apertures of the aperture plate is then chopped or modulated at a different frequency by the rotation of the encoding disc. An identical synchronizing signal for each of such frequency is separately generated by the encoding disc. All of the modulated spectral light is then collected and condensed by the collector and impinged upon a detector, such as a single photo multiplier tube. The total photo multiplier tube output signal passes through filters corresponding to the selected encoding frequencies. The output from each filter is then directed to a separate lock-in amplifier corresponding to each element. The corresponding synchronizing signal generated by the encoding disc is sent to an amplifier which responds only to its dedicated input signal, and no other signal. The results available simultaneously from each selected channel may be used for subsequent high-speed analog to digital conversion or for read-out on a visual screen or multipen recorder.

In summary, my invention comprises an encoding-decoding device for use in spectrometer systems wherein such devices are in cassette form and are easily interchangeable. My devices are particularly useful in spectrometer systems wherein a compact two-dimensional spectral energy displayed is provided. My encoding device is precision-located by the employment of a polar coordinate geometry which employs a central shaft as a primary reference and permits fine adjustment of the angle after positioning of the device. My encoding device is described in particular in connection with the emission spectrometer system; however, as would be apparent to a person skilled in the art, my device may be employed in a variety of one and two-dimensional energy display systems.

What I claim is:

1. A spectrometer which includes an encoding apparatus for encoding the spectral energy of radiation in a focal plane of the spectrometer, which spectrometer comprises in combination:
   a. a means to provide a spectral radiant energy distribution in a focal plane;
   b. an encoding apparatus which includes:
      i. an aperture plate characterized by at least one aperture therein, the aperture positioned to select the desired spectral interval which is to be analyzed from the focal plane;
      ii. a rotatable encoding element characterized by a plurality of encoding apertures therein, the apertures positioned to impose a desired time sequence modulation code upon the spectral energy emerging from the apertures of the aperture plate;
      iii. a shaft assembly including a shaft mounted for rotation in a bearing assembly, the encoding element secured to the shaft for rotation therewith; and
      iv. a frame element securing the aperture plate and encoding element in a close spatial relationship, the frame including a reference-locating element;
   c. a pair of spaced-apart locater elements secured to the spectrometer and adapted to receive the frame element, the locater elements each including an axial locater means adapted to position accurately the shaft assembly;
   d. a means adapted to receive the reference locating element;
   e. a photo multiplier means to receive the modulated radiant energy from the encoding device and to generate an output signal;
   f. means to rotate the shaft; and
   g. a signal-processing means to process the output of the detector means and to provide a quantitative analysis of the encoded spectral elements, whereby on insertion of the encoding apparatus in the spectrometer, the axial locater means permits rapid placement of the device in position, and whereby fine adjustments in the angular position of the encoding disc is provided by the reference-locating element.

2. The spectrometer of claim 1 wherein the axial locater means comprises a pair of hardened V grooves in each of the locater elements, the grooves adapted to receive the shoulders of the bearing of the shaft assembly on insertion of the encoding device.

3. The spectrometer of claim 1 wherein the reference-locating element on the frame includes a reference pin, and wherein the means to receive the reference-locating element includes a restraining track, the reference pin fitting in the restraining track when the encoding device is properly placed in the spectrometer.

4. The spectrometer of claim 3 which includes a means for the adjustment of the track to place the encoding device in a desired position.

5. The spectrometer of claim 1 wherein the optical means includes the combination of a prism and an echelle grating, the means for rotating the prism substantially parallel to the prism face and means to rotate the grating substantially parallel to the grating rulings, whereby a two-dimensional horizontal-vertical spectral energy distribution is obtained at the focal plane.

6. The spectrometer of claim 1 wherein the encoding apparatus includes:
   a. an aperture plate characterized by a separate decoding plate area having at least one aperture and corresponding to the spectral interval selected for analysis in the other section of the plate;
   b. a light source to provide illumination of the decoding of the elements encoded; and
   c. a decoding means which includes an individual detector positioned to receive the encoded energy for each aperture from the separate plate area which has been encoded by the rotating encoding element, the signal-processing means adapted to employ the electrical synchronizing signal from each individual photo detector to decode the encoded spectral elements.

7. A spectrometer which includes an encoding-decoding apparatus for encoding and decoding the spectral energy of radiation in a two-dimensional focal plane of the spectrometer, which spectrometer comprises in combination:
   a. an optical means to provide a two-dimensional spectral radiant energy distribution in essentially square focal plane;
   b. encoding-decoding apparatus which includes:
      i. a stationary aperture plate having an upper and lower section, each section characterized by a plurality of apertures therein, the apertures of the encoding area positioned to select the desired spectral integral which is to be analyzed from the two-dimensional focal plane, and the other decoding area containing a plurality of apertures positioned to receive illumination of an independent light source for decoding the desired spectral integral which is to be encoded;
      ii. a rotatable encoding element characterized by a plurality of encoding apertures therein, the apertures positioned to impose a desired time sequence modulation code upon the spectral energy emerging from the apertures of the aperture plate;
      iii. a shaft assembly including a shaft mounted for rotation in a bearing assembly, the encoding element secured to the shaft for rotation therewith; and
      iv. a frame element securing the aperture plate and encoding element in close spatial relationship, the frame including a reference-locating element;
   c. an independent light source to provide illumination only to the decoding area of the aperture plate;
   d. a pair of spaced-apart locater elements secured to the spectrometer and adapted to receive the frame element, the locater elements including a hardened V groove, the groove adapted to receive the shoulders of the bearing assembly on insertion of the encoding-decoding apparatus between the locater elements;
   e. a restraining track adapted to receive the reference-locating elements of the frame, whereby on proper positioning of the encoding-decoding apparatus the reference pin fits in a proper position in the restraining track;
   f. photo multiplier means to receive the modulated radiant energy from the encoding area of the aperture plate, and to generate an electrical output signal;
   g. individual detector means to receive the modulated radiant energy from the decoding areas of the aperture plate as modulated by the rotating encoding element;
   h. means to rotate the shaft; and
   i. signal-processing means to process the output of the photo multiplier and the synchronizing signals from the individual detectors of the decoding area of the aperture plate.

8. The spectrometer of claim 7 wherein the optical means to provide a two-dimensional radiant energy distribution includes the combination of a prism and an echelle grating, the means for rotating the prism substantially parallel to the prism face, and means to rotate the grating substantially parallel to the grating rulings, whereby a two-dimensional vertical-horizontal spectral energy distribution is obtained at the focal plane.

9. An encoding-decoding cassette for employment in a spectrometer, which encoding-decoding cassette comprises in combination:
   a. a stationary aperture plate containing an encoding and decoding area, each area characterized by at least one aperture therein, the aperture positioned in the encoding area to select the desired spectral integral which is to be analyzed from the focal plane of the spectrometer, and the aperture positioned in the decoding area to receive illumination from an internal light source to provide an individual synchronizing signal for each element so encoded;
   b. a rotatable encoding element characterized by a plurality of encoding apertures therein, the apertures positioned to impose a desired time sequence modulation code upon the spectral energy emerging from the encoding and decoding apertures of the aperture plate;
   c. a shaft assembly, including a shaft mounted for rotation in a bearing assembly, the encoding element secured to the shaft for rotation therewith;
   d. a frame element securing the aperture plate and encoding element in a close spatial relationship, the frame including a reference-locating element; and
   e. a plurality of individual photo detectors to detect the individual signals modulated by the encoding element in the decoding area of the aperture plate, whereby upon positioning the encoding-decoding cassette in a spectrometer system, the shaft assembly provides a primary reference point with fine angular adjustment of the cassette position possible through the reference-locating element of the frame wherein the modulated radiant energy from the encoding area of the aperture plate may be forwarded to a single photo multiplier, and wherein the individual synchronizing signals from the individual photo detectors of the decoding area may be employed to decode the encoded elements, thereby providing a quantitative analysis of the encoded spectral elements.

10. A method for the rapid interchanging and accurate positioning of an encoding cassette apparatus in the focal plane of a spectrometer system wherein the encoding cassette comprises an aperture plate, and a rotating encoding plate mounted for rotation of a shaft, which method comprises:

a. providing in the spectrometer system a means to secure the shaft of the encoding cassette in an axial location so that the aperture plate is in the focal plane of the spectrometer;

b. inserting an encoding cassette apparatus in the spectrometer system so that the shaft is positioned in a primary precision-locating position in the system; and c. adjusting the angular rotation of the cassette apparatus while the shaft is secured as the primary reference, thereby employing a polar coordinate method to locate rapidly with precision the encoding cassette.

11. The method of claim 10 which includes providing a focal plqne of spectral energy which is two-dimensional and essentially square in geometric form.

12. The method of claim 10 which includes providing a driving means so that on inserting the encoding cassette, the encoding plate is rotated, which means disengages on removal of the cassette apparatus.

13. The method of claim 10 which includes providing as the primary reference-locating means a pair of hardened V grooves on which the shoulder of a bearing assembly surrounding the shaft is positioned on insertion of the cassette apparatus.

* * * * *